Patented Feb. 24, 1953

2,629,720

UNITED STATES PATENT OFFICE 2,629,720

N-ALKYL-N-ALPHA-THENYL ANILINES

Lucas P. Kyrides, Zeeland, Mich., assignor to Monsanto Chemical Company, St. Louis, Mo., a corporation of Delaware No Drawing. Application December 20, 1947, Serial No. 793,057

11 Claims. (Cl. 260—329)

This invention relates to a novel thenyl derivative and to a method for its preparation.

One of the objects of the present invention is to prepare as novel compounds, certain N-alkyl-N-alpha-thenyl anilines. Another object is to provide a process for preparing certain N-alkyl-N-alpha-thenyl anilines. Other objects will become apparent from the following description.

According to the present invention, generally stated, N-alkyl-N-alpha-thenyl anilines having the formula:

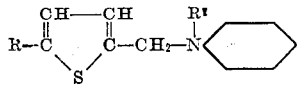

in which R represents hydrogen, methyl, chlorine or bromine, and $R_1$ represents an alkyl radical containing 1–4 carbon atoms may be prepared by heating a mixture of the appropriate alpha-thenyl chloride or alpha-thenyl bromide and the appropriate N-alkyl aniline and subsequently recovering the corresponding N-alkyl-N-alpha-thenyl aniline from the reaction mixture, for example, by adding water and benzene to the reaction mixture and alkalizing the mixture. The water layer may then be separated and washed with benzene. The benzene solution may then be washed with water and subsequently distilled.

The following examples will serve to illustrate the present invention.

Example I

To 121.2 g. (1 mole) of N-ethyl aniline heated at 95–100° C. was slowly added over a period of approximately 1 hour 66.3 g. (0.5 mole) of alpha-thenyl chloride. The reaction mixture was heated at 95–100° C. for a total of approximately 5 hours and was then allowed to stand overnight. To the reaction was added 100 cc. of benzene, 100 cc. of water and 40 g. of 50% caustic soda solution. The aqueous layer was separated and washed with benzene. The benzene solution was washed with water and distilled. There was obtained 69.9 g. of ethyl aniline and 82.7 g. of N-ethyl-N-alpha-thenyl aniline (76.2% yield based on alpha-thenyl chloride, and 79.3% yield based on the ethyl aniline consumed). The N-ethyl-N-alpha-thenyl aniline was found to have a boiling point of approximately 128° C./1 mm. A high boiling residue weighing 18.9 g. remained in the distillation flask.

Example II

To one mole of N-butyl aniline heated at 95–100° C. was slowly added over a period of approximately one hour 0.5 mole of 2-chloromethyl-5-chloro-thiophene. The reaction mixture was heated at 95–100° C. for a total of approximately five hours and was then allowed to stand overnight. The reaction mixture was then processed according to the procedure described in Example I. The product recovered was N-butyl-N-(5-chloro-2-thenyl) aniline. In place of 2-chloromethyl-5-chloro-thiophene in the present example, 0.5 mole of 2-bromomethyl-5-chloro-thiophene may be employed.

Example III

To 1 mole of N-isopropyl aniline heated at 95–100° C. was slowly added over a period of approximately 1 hour 0.5 mole of 2-chloromethyl-5-bromo-thiophene. The reaction mixture was heated at 95–100° C. for a total of approximately 5 hours and was then allowed to stand overnight. The reaction mixture was then processed according to the procedure described in Example I. The product recovered was N-isopropyl-N-(5-bromo-2-thenyl) aniline. In place of 2-chloromethyl-5-bromo-thiophene in the present example 0.5 mole of 2-bromomethyl-5-bromo-thiophene may be employed.

Example IV

To 1 mole of N-methyl aniline heated at 95–100° C. was slowly added over a period of approximately 1 hour 0.5 mole of 2-chloromethyl-5-methyl-thiophene. The reaction mixture was heated at 95–100° C. for a total of approximately 5 hours and was then allowed to stand overnight. The reaction mixture was then processed according to the procedure described in Example I. The product recovered was N-methyl-N-(5-methyl-2-thenyl) aniline. In place of 2-chloromethyl-5-methyl-thiophene in the present example, 0.5 mole of 2-bromomethyl-5-methyl-thiophene may be employed.

Example V

To 1 mole of N-ethyl aniline heated at 95–100° C. was slowly added over a period of approximately 1 hour 0.5 mole of 2-chloromethyl-5-chloro-thiophene. The reaction mixture was heated at 95–100° C. for a total of approximately 5 hours and was then allowed to stand overnight. The reaction mixture was then processed according to the procedure described in Example I. The product recovered was N-ethyl-N-(5-chloro-2-thenyl) aniline. In place of 2-chloromethyl-5-chloro-thiophene in the present example, 0.5 mole of 2-bromomethyl-5-chloro-thiophene may be employed.

Example VI

To 1 mole of N-ethyl aniline heated at 95–100° C. was slowly added over a period of approximately 1 hour 0.5 mole of 2-chloromethyl-5-bromo-thiophene. The reaction mixture was heated at 95–100° C. for a total of approximately 5 hours and was then allowed to stand overnight. The reaction mixture was then processed according to the procedure described in Example I. The product recovered was N - ethyl - N(5-bromo-2-thenyl) aniline. In place of 2-chloromethyl-5-bromo thiophene in the present example, 0.5 mole of 2-bromomethyl-5-bromo-thiophene may be employed.

While certain conditions and proportions of the reactants have been described hereinabove, it is to be understood that the present invention is not to be limited to these conditions and proportions, but these may be varied over a wide range depending upon the circumstances under which the reaction is conducted. The reaction may be conducted at temperatures lower than 95–100° C., for example, at room temperature (25–30° C.) for a longer period of time. The preferred operation, however, is that in which the temperature is in the range of 95–100° C. The novel products of the present invention, N-alkyl-N-alpha-thenyl anilines of the types herein described and their acid salts, such as the hydrochlorides, acetates and sulfates, are useful as intermediates in the preparation of dyestuffs, wetting, dispersing and emulifying agents, insecticides, toxicants and numerous other materials. The acid salts of the free base compounds may be prepared by reacting the compounds with aqueous or alcohol solutions of the corresponding acids and recovering the salts thus formed by any suitable means, as for example by evaporation and recrystallization.

I claim:

1. N-alkyl-N-alpha-thenyl anilines having the formula:

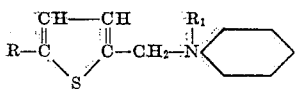

in which R represents a radical selected from the group consisting of hydrogen, methyl, chlorine and bromine radicals, and where $R_1$ is an alkyl group containing 1–4 carbon atoms, and the acid salts thereof.

2. N-ethyl-N-alpha-thenyl aniline having the formula:

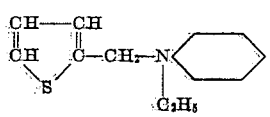

and the acid salts thereof.

3. N-ethyl-N-(5-chloro-2-thenyl) aniline having the formula:

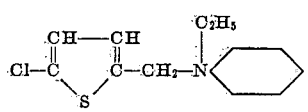

and the acid salts thereof.

4. N-ethyl-N-(5-bromo-2-thenyl) aniline having the formula:

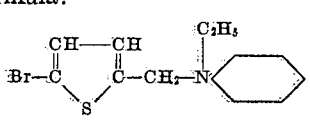

and the acid salts thereof.

5. A process of making N-alkyl-N-alpha-thenyl anilines having the formula:

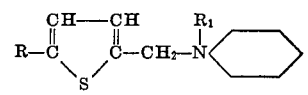

in which R represents a radical selected from the group consisting of hydrogen, methyl, chlorine and bromine radicals and $R_1$ represents an alkyl radical containing 1–4 carbon atoms comprising heating a mixture of an alpha-thenyl halide having the formula:

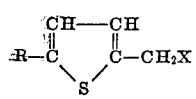

in which R represents a radical selected from the group consisting of hydrogen, methyl, chlorine and bromine radicals and X represents a radical selected from the group consisting of chlorine and bromine, and an N-alkyl aniline in which the alkyl radical contains 1–4 carbon atoms at a temperature in the range of approximately 95–100° C. until the reaction is complete and recovering the N-alkyl-N-alpha-thenyl aniline product from the reaction mixture.

6. A process of making N-alkyl-N-alpha-thenyl anilines having the formula:

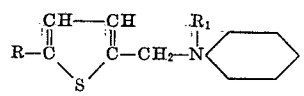

in which R represents a radical selected from the group consisting of hydrogen, methyl, chlorine and bromine radicals and $R_1$ represents an alkyl radical containing 1–4 carbon atoms comprising heating a mixture of an alpha-thenyl halide having the formula:

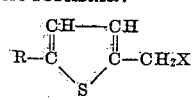

in which R represents a radical selected from the group consisting of hydrogen, methyl, chlorine and bromine radicals and X represents a radical selected from the group consisting of chlorine and bromine, and an N-alkyl aniline in which the alkyl radical contains 1–4 carbon atoms at a temperature in the range of approximately 95–100° C. for approximately 5 hours, diluting the reaction mixture, isolating the non-aqueous layer and subsequently recovering the N-alkyl-N-alpha-thenyl aniline product from said layer.

7. A process of making N-ethyl-N-alpha-thenyl aniline comprising heating a mixture of alpha-thenyl chloride and N-ethyl aniline at a temperature in the range of approximately 95–100° C. until the reaction is complete and recovering N-ethyl-N-alpha-thenyl aniline from the reaction mixture.

8. A process of making N-ethyl-N-alpha-thenyl aniline comprising heating a mixture of alpha-thenyl chloride and N-ethyl aniline at a temperature in the range of approximately 95–100° C. for approximately 5 hours, diluting the reaction mixture with water and benzene, alkalizing the reaction mixture, isolating the non-aqueous layer and subsequently recovering N-ethyl-N-alpha-thenyl aniline from said layer.

9. A process of making N-ethyl-N-(5-chloro-2-thenyl) aniline comprising heating a mixture of 2-chloromethyl-5-chlorothiophene and N-ethyl aniline at a temperature in the range of approximately 95–100° C. until the reaction mixture is complete and recovering N-ethyl-N-(5-chloro-2-thenyl) aniline from the reaction mixture.

10. A process of making N-ethyl-N-(5-bromo-2-thenyl) aniline comprising heating a mixture of 2-chloromethyl-5-bromo-thiophene and N-ethyl aniline at a temperature in the range of approximately 95–100° C. for approximately 5 hours, diluting the reaction mixture with water and benzene, alkalizing the reaction mixture, isolating the non-aqueous layer and subsequently recovering N-ethyl-N-(5-bromo-2-thenyl) aniline from said layer.

11. A process of making N-alkyl-N-alpha-thenyl anilines having the formula:

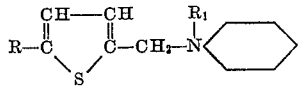

in which R represents a radical selected from the group consisting of hydrogen, methyl, chlorine and bromine radicals and $R_1$ represents an alkyl radical containing 1–4 carbon atoms comprising reacting a mixture of an alpha-thenyl halide having the formula:

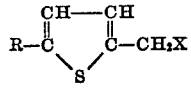

in which R represents a radical selected from the group consisting of hydrogen, methyl, chlorine and bromine radicals and X represents a radical selected from the group consisting of chlorine and bromine, and an N-alkyl aniline in which the alkyl radical contains 1–4 carbon atoms until the reaction is complete and recovering the N-alkyl-N-alpha-thenyl aniline product from the reaction mixture.

LUCAS P. KYRIDES.

REFERENCES CITED

The following references are of record in the file of this patent:

Powers, Advancing Fronts in Chemistry, vol. 2, page 33, Reinhold Pub. Co., N. Y., 1946.
Whitmore, Organic Chemistry, p. 893, Van Nostrand, N. Y., 1937.
Bernthsen and Sudborough, "Organic Chemistry," p. 549, Van Nostrand, N. Y., 1925 (1922 edition).
Caesar and Sachanen, Ind. Eng. Chem. 40, No. 5, May 1948, page 922.
Wedekind, Berichte, 32, 519.
Richter, "Organic Chemistry," pp. 649–650, Wiley, N. Y., 1938.